United States Patent
Mori et al.

(10) Patent No.: US 11,217,800 B2
(45) Date of Patent: Jan. 4, 2022

(54) FUEL CELL SYSTEM

(71) Applicant: KABUSHIKI KAISHA TOYOTA JIDOSHOKKI, Aichi (JP)

(72) Inventors: Hidefumi Mori, Aichi-ken (JP); Junya Suzuki, Aichi-ken (JP); Kazuki Okazaki, Aichi-ken (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 0 days.

(21) Appl. No.: 16/934,809

(22) Filed: Jul. 21, 2020

(65) Prior Publication Data

US 2021/0028470 A1    Jan. 28, 2021

(30) Foreign Application Priority Data

Jul. 24, 2019    (JP) .............. JP2019-136160

(51) Int. Cl.
*H01M 8/04111*    (2016.01)
*H01M 8/04746*    (2016.01)

(52) U.S. Cl.
CPC .... *H01M 8/04111* (2013.01); *H01M 8/04761* (2013.01)

(58) Field of Classification Search
CPC ............. H01M 8/04111; H01M 8/04761
See application file for complete search history.

(56) References Cited

U.S. PATENT DOCUMENTS

| | | | |
|---|---|---|---|
| 2009/0130510 A1* | 5/2009 | Ishikawa | H01M 8/04619 429/411 |
| 2015/0285191 A1* | 10/2015 | Kitada | F02B 37/162 60/605.2 |

FOREIGN PATENT DOCUMENTS

| | | |
|---|---|---|
| DE | 102011087912 | 6/2013 |
| JP | 2012-169039 | 9/2012 |

* cited by examiner

*Primary Examiner* — Olatunji A Godo
(74) *Attorney, Agent, or Firm* — Greenblum & Bernstein, P.L.C.

(57) ABSTRACT

A fuel cell system includes a target pressure value for the pressure in a fuel cell is set depending on a demand output value to the fuel cell. A turbine retains a set pressure line representing a relationship between an airflow rate supplied to the turbine and a pressure ratio corresponding to a ratio of a pressure upstream of the turbine and a pressure downstream of the turbine. A controller executes a first control when the target pressure value for the fuel cell is lower than the set pressure line and executes a second control when the target pressure value for the fuel cell is higher than the set pressure line. The controller controls an outlet valve so as not to be fully opened when a turbine bypass valve is fully closed.

6 Claims, 5 Drawing Sheets

|  | STATE OF FUEL CELL | OUTLET VALVE | TURBINE BYPASS | SUPPLY OF GAS TO |
|---|---|---|---|---|
| TARGET PRESSURE VALUE LOWER THAN SET PRESSURE LINE (FIRST CONTROL) | INCREASE PRESSURE | FULLY OPENED | REDUCE OPENING | INCREASE |
|  | DECREASE PRESSURE | FULLY OPENED | INCREASE OPENING | REDUCE |
| TARGET PRESSURE VALUE HIGHER THAN SET PRESSURE LINE (SECOND CONTROL) | INCREASE PRESSURE | REDUCE OPENING | FULLY CLOSED | INCREASE |
|  | DECREASE PRESSURE | INCREASE OPENING | FULLY CLOSED | INCREASE |

FUEL CELL SYSTEM

CROSS-REFERENCE TO RELATED APPLICATION

This application claims priority to Japanese Patent Application No. 2019-136160 filed on Jul. 24, 2019, the entire disclosure of which is incorporated herein by reference.

BACKGROUND ART

The present disclosure relates to a fuel cell system.

Japanese Patent Application Publication No. 2012-169039 discloses a fuel cell system including a fuel cell (stack), a three-way valve disposed on a discharge side of the fuel cell, and a turbine (expander) connected to the discharge side of the fuel cell through the three-way valve. While the fuel cell generates electric power, the three-way valve is controlled so as to supply cathode exhaust gas to the turbine. The three-way valve is controlled so that the scavenging air bypasses the turbine during the air scavenging in the fuel cell.

A turbine bypass valve such as a three-way valve is disposed upstream of the turbine, and the turbine bypass valve is configured to operate so as to supply the cathode exhaust gas to the turbine, or so as not to supply cathode exhaust gas to the turbine so that the cathode exhaust gas bypasses the turbine. The three-way valve disclosed in the Publication operates according to whether or not the air scavenging takes place.

In the fuel cell system, a target pressure value for the pressure in the fuel cell is set depending on demand output values to the fuel cell. In a conventional fuel cell system, operations of a turbine bypass valve and the like are not controlled for obtaining greater power recovery efficiency of the turbine when increasing and decreasing the pressure in the fuel cell toward the target pressure value. There is a room for improvement in the conventional fuel cell systems to obtain greater power recovery efficiency of the turbine when increasing and decreasing the pressure in the fuel cell toward the target pressure value.

The present disclosure is directed to providing a fuel cell system having a configuration that permits increasing power recovery efficiency of a turbine while maintaining the pressure adjustment function of the fuel cell.

SUMMARY

In accordance with an aspect of the present disclosure, there is provided a fuel cell system including a fuel cell, a supply passage through which a cathode gas is supplied to the fuel cell, a discharge passage to which a cathode exhaust gas from the fuel cell is discharged, a turbine generating power with the cathode exhaust gas supplied from the discharge passage, an outlet valve disposed between the fuel cell and the turbine in the discharge passage and controlling the flow rate of the cathode exhaust gas discharged from the fuel cell to the discharge passage, a turbine bypass passage including a first connecting portion connected to the discharge passage at a position between the outlet valve and the turbine and a second connecting portion connected to the discharge passage at a position downstream of the turbine, the first connecting portion and the second connecting portion being communicable with each other, a turbine bypass valve disposed between the first connecting portion and the second connecting portion of the turbine bypass passage and controlling the flow rate of the cathode exhaust gas flowing through the turbine bypass passage, a pressure sensor detecting a pressure in the fuel cell, and a controller controlling an opening degree of the outlet valve and an opening degree of the turbine bypass valve based on data detected by the pressure sensor. A target pressure value for the pressure in the fuel cell is set depending on a demand output value to the fuel cell. The turbine retains a set pressure line representing a relationship between an airflow rate supplied to the turbine and a pressure ratio corresponding to a ratio of a pressure upstream of the turbine and a pressure downstream of the turbine. The controller executes a first control when the target pressure value for the fuel cell is lower than the set pressure line and executes a second control when the target pressure value for the fuel cell is higher than the set pressure line. The controller controls the outlet valve so as not to be fully opened when the turbine bypass valve is fully closed.

Other aspects and advantages of the present disclosure will become apparent from the following description, taken in conjunction with the accompanying drawings, illustrating by way of example the principles of the present disclosure.

BRIEF DESCRIPTION OF THE DRAWINGS

The present disclosure together with objects and advantages thereof may best be understood by reference to the following description of the presently preferred embodiments together with the accompanying drawings in which.

DETAILED DESCRIPTION OF THE EMBODIMENTS

The following will describe embodiments of the present disclosure with reference to the accompanying drawings. In

First Embodiment (Fuel Cell System 10)

Figure 1:
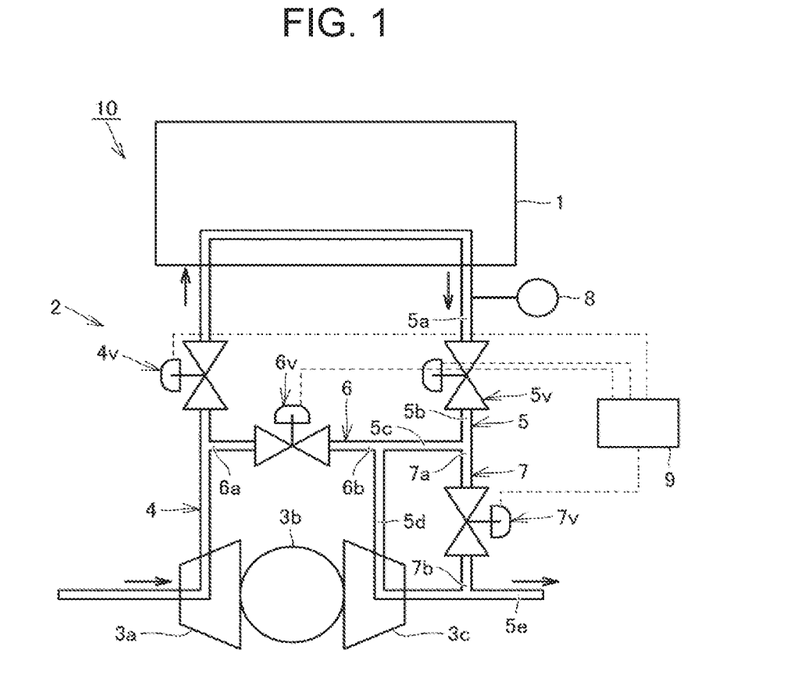
FIG. 1 is a schematic view of a fuel cell system according to a first embodiment of the present disclosure.

FIG. 1 is a schematic view of a fuel cell system 10 according to a first embodiment of the present disclosure. The fuel cell system 10 includes a fuel cell 1, a cathode gas supply system 2, and an anode gas supply system (not shown). The fuel cell 1 generates electric power with anode gas (hydrogen) and cathode gas (air) supplied to the fuel cell 1.

The cathode gas supply system 2 includes a compressor 3a, a motor 3b, a turbine 3c, a supply passage 4, an inlet valve 4v, a discharge passage 5, an outlet valve 5v, a stack bypass passage 6, a stack bypass valve 6v, a turbine bypass passage 7, a turbine bypass valve 7v, a pressure sensor 8, and a controller 9.

Cathode gas is compressed by the compressor 3a and supplied to the supply passage 4. The supply passage 4 connects the fuel cell 1 with the compressor 3a, and cathode gas is supplied through the supply passage 4 to the fuel cell 1. The inlet valve 4v is disposed between the fuel cell 1 and the compressor 3a in the supply passage 4. The inlet valve 4v is provided by a regulating valve and the like, specifically, an electromagnetic valve. The inlet valve 4v is configured to control the flow rate of cathode gas supplied to the fuel cell 1.

The discharge passage 5 connects the fuel cell 1 with the turbine 3c, and cathode exhaust gas is discharged from the fuel cell 1 to the discharge passage 5. The cathode exhaust gas is supplied to the turbine 3c. At this time, the turbine 3c recovers energy and generates power. The turbine 3c and the compressor 3a are connected via a shaft (not shown). Energy recovered by the turbine 3c is used as driving power for rotating the compressor 3a. The compressor 3a may be driven to rotate by the motor 3b as well.

The discharge passage 5 has pipes 5a, 5b, 5c, 5d, 5e. The outlet valve 5v is disposed between the fuel cell 1 and the turbine 3c (between the pipe 5a and the pipe 5b) in the discharge passage 5. The outlet valve 5v is provided by a regulating valve and the like, specifically, an electromagnetic valve. The outlet valve 5v is configured to control the flow rate of cathode exhaust gas that is discharged from the fuel cell 1 to the discharge passage 5.

The stack bypass passage 6 has connecting portions 6a, 6b that are communicable with each other. The connecting portion 6a is connected to the supply passage 4 at a position between the compressor 3a and the inlet valve 4v. The connecting portion 6b is connected to the discharge passage 5 at a position between the outlet valve 5v and the turbine 3c (between the pipe 5c and the pipe 5d).

The cathode gas discharged from the compressor 3a flows through the stack bypass passage 6 to bypass the fuel cell 1 and is supplied to the turbine 3c. The stack bypass valve 6v is disposed between the connecting portion 6a and the connecting portions 6b. The stack bypass valve 6v is configured to control the flow rate of cathode gas flowing through the stack bypass passage 6.

The turbine bypass passage 7 has a first connecting portion 7a and a second connecting portion 7b that are communicable with each other. The first connecting portion 7a is connected to the discharge passage 5 at a position between the outlet valve 5v and the turbine 3c (between the pipe 5b and the pipe 5c). The second connecting portion 7b is connected to the discharge passage 5 at a position downstream of the turbine 3c (the pipe 5e).

The cathode exhaust gas discharged from the fuel cell 1 flows through the turbine bypass passage 7 to bypass the turbine 3c and is supplied to the pipe 5e. The turbine bypass valve 7v is disposed between the first connecting portion 7a and the second connecting portion 7b. The turbine bypass valve 7v is configured to control the flow rate of cathode exhaust gas flowing through the turbine bypass passage 7.

A pressure sensor 8 is disposed in the pipe 5a and detects the pressure in the fuel cell 1. Data indicating detection results by the pressure sensor 8 is input to the controller 9. The controller 9 controls the respective opening degrees of the inlet valve 4v, the outlet valve 5v, and the turbine bypass valve 7v based on the data indicating results of detection by the pressure sensor 8. The controller 9 can be circuitry including: 1) one or more processors that run on a computer program (software); 2) one or more exclusive hardware circuits such as an application specific integrated circuit (ASIC) that executes at least part of various types of processes, or 3) a combination thereof. A processor includes a CPU and a memory such as a RAM or a ROM. The memory stores program codes or commands that are configured to execute a process with the CPU. The memory, which is a computer readable medium, may be any available medium that is accessible by a versatile or dedicated computer.

An output of the fuel cell 1 (the amount of electric power generated by the fuel cell 1) changes depending on the flow rate of gas and the pressure in the fuel cell 1. For example, an ECU mounted on the vehicle calculates a demand output value to the fuel cell 1 based on the opening degree of the accelerator and the like, and the target flow rate (demand flow rate) and the target pressure value (demand pressure value) in the fuel cell 1 are determined depending on the demand output value.

In the fuel cell system 10, the controller 9 reduces the opening degree of at least one of the outlet valve 5v and the turbine bypass valve 7v when increasing the pressure in the fuel cell 1 to the target pressure value, and the controller 9 increases the opening degree of at least one of the outlet valve 5v and the turbine bypass valve 7v when decreasing the pressure in the fuel cell 1 to the target pressure value.

A turbine has a predetermined displacement. In the fuel cell system 10, the turbine 3c of a fixed displacement type is used. The turbine is a means for recovering energy of cathode exhaust gas as driving power, and causes pressure loss similarly to a regulating valve, a pipe, a throttle, and the like.

Such pressure loss affects the pressure in the fuel cell 1. The pressure in the fuel cell 1 is determined not only by the flow rate and the pressure of cathode gas supplied to the fuel cell 1 (i.e., the opening degree of the inlet valve 4v), but also by the opening degree of the outlet valve 5v, the specifications (the size and the shape) of the turbine 3c, the flow rate and the pressure of fluid supplied to the turbine 3c, and the specification and the opening degree of the turbine bypass valve 7v, and the like.

Figure 2:
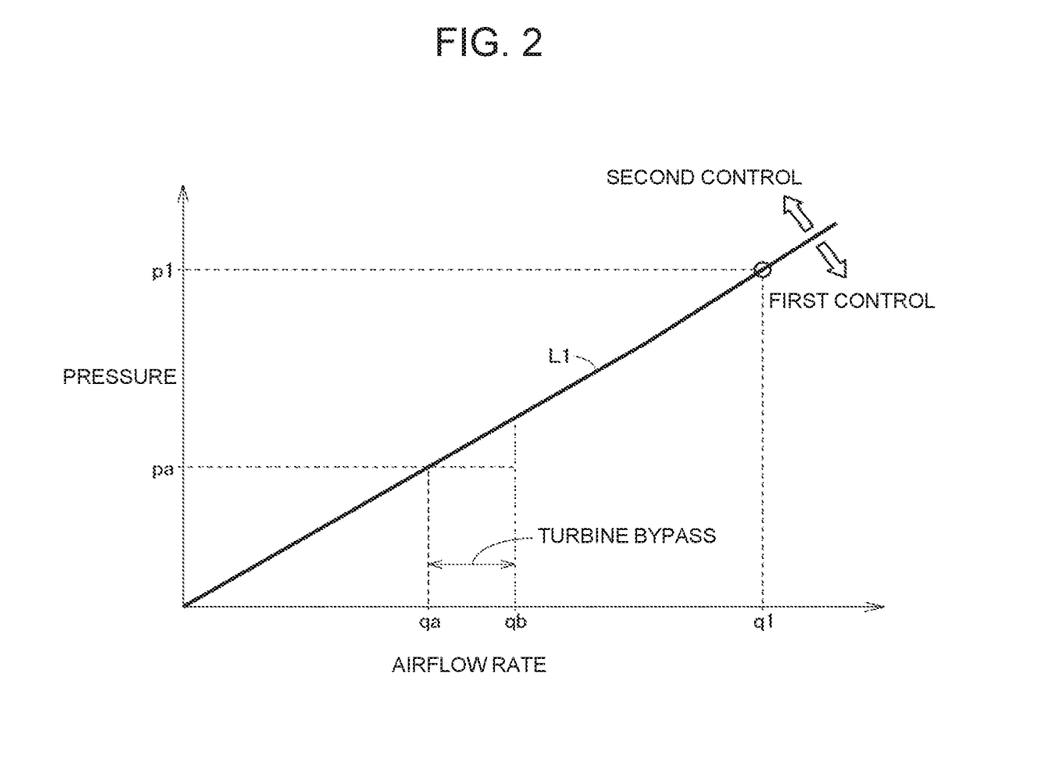
FIG. 2 is a chart, indicating the relationship between an airflow rate of gas supplied to a turbine and a pressure ratio representing a ratio of the pressure upstream of the turbine to the pressure downstream of the turbine.

FIG. 2 is a chart indicating the relationship between the airflow rate of gas supplied to the turbine and the pressure ratio representing a ratio of the pressure upstream of the turbine to the pressure downstream of the turbine. The turbine includes a turbine impeller. The turbine impeller is disposed in a passage in the turbine having the predetermined diameter of the opening and the predetermined cross sectional area. Dimensions of the turbine such as the diameter of the opening determine the pressure ratio relative to the airflow rate, That is, the airflow rate relative to the pressure ratio is determined depending on the diameter of the opening of the turbine and the like.

The turbine retains a characteristic (specification) representing the relationship between the airflow rate and the pressure ratio, which may be generally indicated by a linear line L1 shown in FIG. 2. Such relationship between the airflow rate and the pressure ratio may be called as a set pressure line. In other words, the turbine retains the set pressure line corresponding to the relationship between the airflow rate of gas supplied to the turbine and the pressure ratio corresponding to a ratio of the pressure upstream of the turbine to the pressure downstream of the turbine. The set pressure line may be indicated by a curve of quadratic function. The set pressure line (the linear line L1) shown in FIG. 2 indicates an example of the relationship between the airflow rate and the pressure ratio of the turbine 3c when the outlet valve 5v is fully opened and the turbine bypass valve 7v is fully closed.

Predetermined values for the diameter of the opening and the cross sectional area of the turbine are calculated for increasing or maximizing the power recovery efficiency of the turbine, and such values are reflected in the design. For example, the diameter of the opening and the cross sectional area of the turbine are set so that a pressure ratio p1 of the pressure upstream of the turbine to the pressure downstream of the turbine is achieved when an airflow rate q1 of gas is supplied to the turbine. A use of the turbine 3c and its operation in a condition in which the relationship between the airflow rate and the pressure ratio is brought closer to the set pressure line permit obtaining effects expected at the design stage such as reducing the consumption of electric power and increasing the power recovery efficiency of the turbine.

In bringing the relationship between the airflow rate and the pressure ratio closer to the set pressure line, it is assumed that the airflow rate qb of gas is supplied to the turbine 3c depending on the target pressure value for the pressure in the fuel cell 1. In order to achieve a desired pressure ratio pa corresponding to a ratio of the pressure upstream of the turbine 3c to the pressure downstream of the turbine 3c, it is controlled so that the amount of gas (the airflow rate qb−airflow rate qa) bypasses the turbine 3c through the turbine bypass passage 7. This permits achieving the pressure ratio pa, i.e., the pressure upstream of the turbine 3c to the pressure downstream of the turbine 3c, corresponding to the airflow rate qa, so that a use of the turbine and its operation in the condition in which the relationship between the airflow rate and the pressure ratio is brought closer to the set pressure line may be achieved.

As has been described, the target flow rate and the target pressure value for the fuel cell 1 changes depending on the opening degree of the accelerator and the like. Unless special measures are taken, the flow rate and the pressure of gas supplied to the turbine tend to be separated from the set pressure line (e.g., the linear line L1) that is set for reducing the power consumption and improving power recovery efficiency of the turbine, which makes it difficult to reduce the power consumption and to improve the power recovery efficiency of the turbine sufficiently in some case.

In the fuel cell system 10, the controller 9 controls the operation of the turbine bypass valve 7v and the like when increasing and decreasing the pressure in the fuel cell 1 toward the target pressure value. Specifically, the controller 9 reduces the opening degree of at least one of the outlet valve 5v and the turbine bypass valve 7v when increasing the pressure in the fuel cell 1 to the target pressure value, and the controller 9 increases the opening degree of at least one of the outlet valve 5v and the turbine bypass valve 7v when decreasing the pressure in the fuel cell 1 to the target pressure value. This control operation permits increasing the power recovery efficiency of the turbine more easily, as compared with the conventional fuel cell systems.

Figure 3:
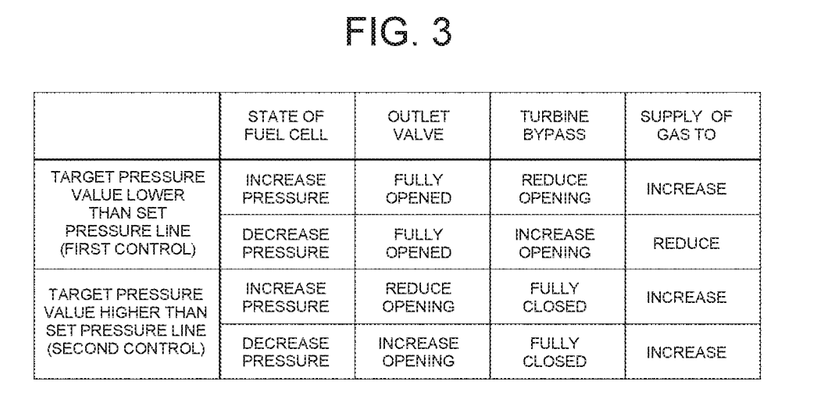
FIG. 3 is a table for describing the details of a first control and a second control.

Referring to FIG. 3, the controller 9 executes a first control when the target pressure value for the fuel cell 1 is lower than the set pressure line (e.g., the linear line L1) and a second control when the target pressure value for the fuel cell 1 is higher than the set pressure line (e.g., the linear line L1). For example, the inlet valve 4v is fully opened and the stack bypass valve 6v is fully closed in executing both the first control and the second control. In executing the second control, the controller 9 controls the outlet valve 5v so as not to be fully opened when the turbine bypass valve 7v is fully closed. The details of the first control and the second control will be described below.

In the first control, for increasing the pressure in the fuel cell 1 toward the target pressure value, the controller 9 reduces the opening degree of the turbine bypass valve 7v with the outlet valve 5v fully opened. For example, the opening degree of the outlet valve 5v is increased prior to adjusting the opening degree of the turbine bypass valve 7v. Thus, the opening degree of the turbine bypass valve 7v is reduced after the outlet valve 5v is fully opened. These control operations permit increasing the pressure in the fuel cell 1 toward the target pressure value, that is, securing the pressure control function of the fuel cell 1, and increasing the amount of gas supplied to the turbine 3c, so that the power recovery efficiency of the turbine 3c may be secured.

In the first control, for reducing the pressure in the fuel cell 1 toward the target pressure value, the controller 9 increases the opening degree of the turbine bypass valve 7v with the outlet valve 5v fully opened. For example, the opening degree of the outlet valve 5v is increased prior to adjusting the opening degree of the turbine bypass valve 7v. Thus, the opening degree of the turbine bypass valve 7v is increased after the outlet valve 5v is fully opened. Although the amount of gas supplied to the turbine 3c is reduced, these control operations permit reducing the pressure in the fuel cell 1 toward the target pressure value, that is, securing the pressure control function of the fuel cell 1, while securing the amount of gas supplied to the turbine 3c as much as possible, so that the power recovery efficiency of the turbine 3c may be secured.

In the second control, for increasing the pressure in the fuel cell 1 toward the target pressure value, the controller 9 reduces the opening degree of the outlet valve 5v with the turbine bypass valve 7v fully closed. For example, the opening degree of the outlet valve 5v is reduced after adjusting the opening degree of the turbine bypass valve 7v. Thus, the opening degree of the outlet valve 5v is reduced after the turbine bypass valve 7v is fully closed. These control operations permit increasing the pressure in the fuel cell 1 toward the target pressure value, that is, securing the pressure control function of the fuel cell 1, and increasing the amount of gas supplied to the turbine 3c, so that the power recovery efficiency of the turbine 3c may be secured.

In the second control, for decreasing the pressure in the fuel cell 1 toward the target pressure value, the controller 9 increases the opening degree of the outlet valve 5v with the turbine bypass valve 7v fully closed. For example, the opening degree of the turbine bypass valve 7v is reduced prior to adjusting the opening degree of the outlet valve 5v. Thus, the opening degree of the outlet valve 5v is increased after the turbine bypass valve 7v is fully closed. These control operation permits reducing the pressure in the fuel cell 1 toward the target pressure value, that is, securing the pressure control function of the fuel cell 1, and increasing the amount of gas supplied to the turbine 3c, so that the power recovery efficiency of the turbine 3c may be secured.

It is noted that the inlet valve 4v and the outlet valve 5v are fully closed and the stack bypass valve 6v and the turbine bypass valve 7v are set at any opening degree (e.g., full open) at a stop of the fuel cell system 10. A supply and discharge of gas to and from the fuel cell 1 are restricted by setting the inlet valve 4v and the outlet valve 5v fully closed.

Second Embodiment

In the above-described first embodiment (FIG. 1), the outlet valve 5v and the turbine bypass valve 7v are spaced from each other. The controller 9 is configured to operate the outlet valve 5v and the turbine bypass valve 7v individually.

Figure 4:
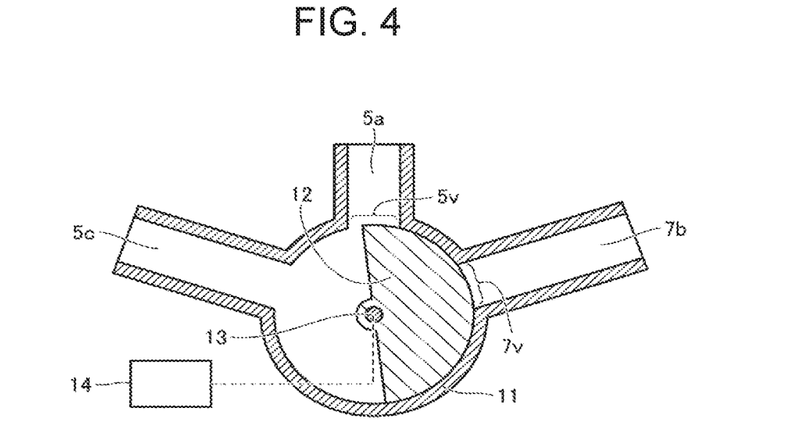
FIG. 4 is a schematic view, showing a configuration example of an outlet valve and a turbine bypass valve according to a second embodiment of the present disclosure.

In the configuration shown in FIG. 4, a single valve body 12 is disposed in a housing 11. The housing 11 has a space in which the valve body 12 is accommodated and to which the pipe 5a in communication with the fuel cell 1 (FIG. 1), the pipe 5c in communication with the turbine 3c, and the second connecting portion 7b in communication with the pipe 5e are connected.

The valve body 12 has a semi-circular shape in cross section, and is rotatably supported by a shaft 13. With the shaft 13 rotated by an actuator 14, the valve body 12 rotates in the housing 11. The outlet valve 5v is formed by the space accommodating the valve body 12 and the pipe 5a therebetween, and the turbine bypass valve 7v is formed by the space and the second connecting portion 7b therebetween.

Figure 5:
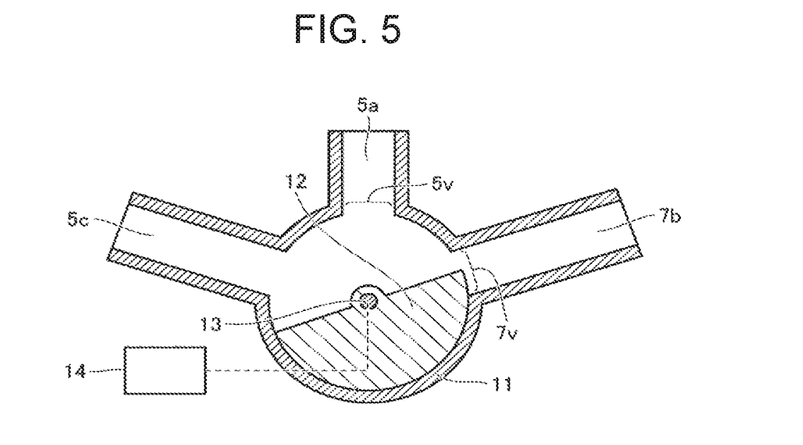
FIG. 5 is a schematic view, showing a state of the outlet valve and the turbine bypass valve according to the second embodiment.

As shown in FIGS. 4 and 5, with the actuator 14 operated by the controller 9 (FIG. 1), the actuator 14 adjusts both the opening degree of the turbine bypass valve 7v and the opening degree of the outlet valve 5v. In a state shown in FIG. 4, the outlet valve 5v controls the flow rate of cathode exhaust gas flowing through the pipe 5a, the pipe 5c, and the turbine 3c (FIG. 1) with the turbine bypass valve 7v set fully closed.

In a state shown in FIG. 5, the turbine bypass valve 7v controls the flow rate of cathode exhaust gas flowing through the pipe 5a, the second connecting portion 7b, and the pipe 5e (FIG. 1) with the pipe 5a set fully opened. With the single valve body 12 operated by the controller 9 (FIG. 1), the single valve body 12 adjusts both the opening degree of the outlet valve 5v and the opening degree of the turbine bypass valve 7v, so that the control operation may be simplified. In addition, both the opening degree of the outlet valve 5v and the opening degree of the turbine bypass valve 7v may be adjusted by the single actuator 14, so that the configuration may be simplified.

Modified Embodiment

Figure 6:
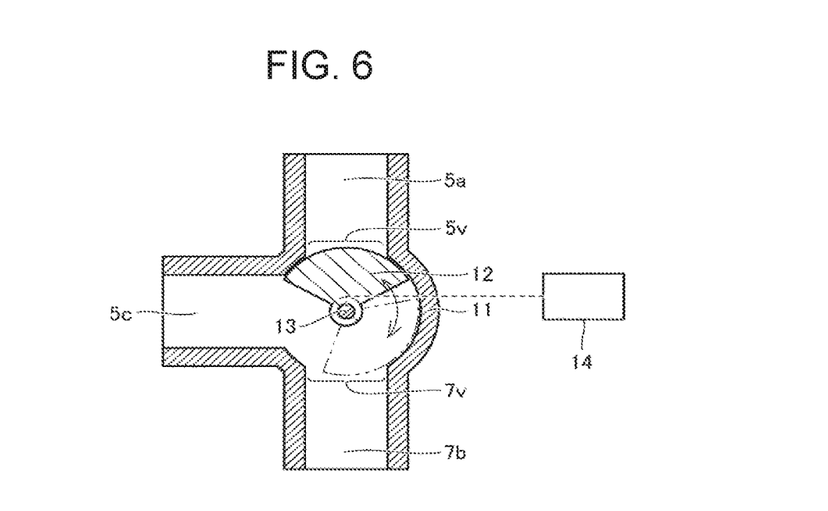
FIG. 6 is a schematic view, showing a modified configuration example of the outlet valve and the turbine bypass valve according to the second embodiment.

A ball valve shown in FIG. 6 may be used for achieving the above-described control operation. In FIGS. 4 and 5, the valve body 12 has a semi-circular shape in cross-section and the pipes are disposed 60 degrees apart from each other in the housing 11. In the configuration shown in FIG. 6, the pipes are disposed 90 degrees apart from each other and the valve body 12 has an inner angle of 120 degrees in the housing 11. This configuration provides a function the same as the above-described configuration.

Third Embodiment

Figure 7:
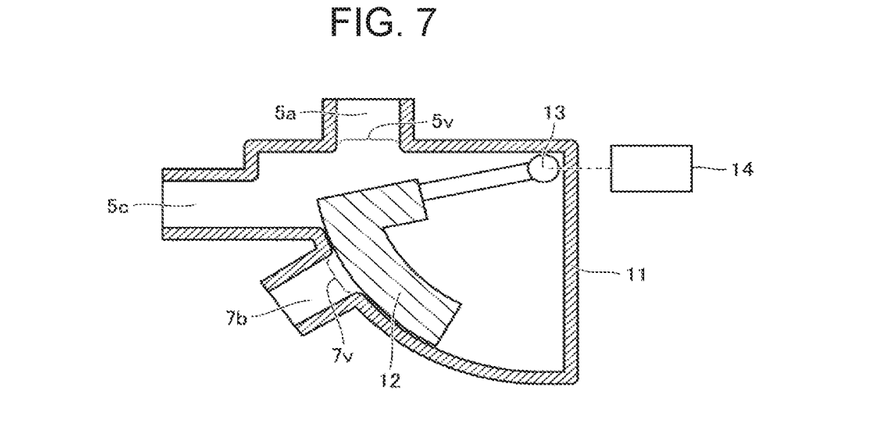
FIG. 7 is a schematic view, showing a configuration example of an outlet valve and a turbine bypass valve according to a third embodiment of the present disclosure.
Figure 8:
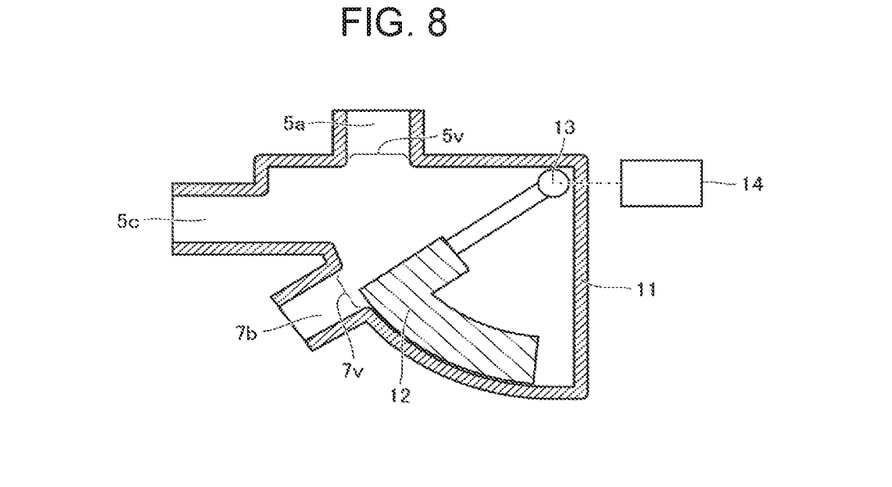
FIG. 8 is a schematic view, showing a state of the outlet valve and the turbine bypass valve according to the third embodiment of the present disclosure.

In the configuration shown in FIGS. 7 and 8, the housing 11 includes a valve body 12 having a shape of a lever handle.

The housing 11 has a space in which the valve body 12 is accommodated and to which the pipe 5a in communication with the fuel cell 1 (FIG. 1), the pipe 5c in communication with the turbine 3c, and the second connecting portion 7b in communication with the pipe 5e are connected.

The valve body 12 has a shape extending in an arc shape and is rotatably supported by the shaft 13. With the shaft 13 rotated by the actuator 14, the valve body 12 moves in a circumferential direction in the housing 11. The outlet valve 5v is formed by the space accommodating the valve body 12 and the pipe 5a therebetween, and the turbine bypass valve 7v is formed by the space and the second connecting portion 7b therebetween.

With the actuator 14 operated by the controller 9 (FIG. 1), the actuator 14 adjusts both the opening degree of the turbine bypass valve 7v and the opening degree of the outlet valve 5v. In a state shown in FIG. 7, the outlet valve 5v controls the flow rate of cathode exhaust gas flowing through the pipe 5a, the pipe 5c, and the turbine 3c (FIG. 1) with the turbine bypass valve 7v set fully closed.

In a state shown in FIG. 8, the turbine bypass valve 7v controls the flow rate of the cathode exhaust gas flowing through the pipe 5a, the second connecting portion 7b, and the pipe 5e (FIG. 1) with the pipe 5a set fully opened. With the single valve body 12 operated by the controller 9 (FIG. 1), the single valve body 12 adjusts both the opening degree of the outlet valve 5v and the opening degree of the turbine bypass valve 7v, so that the control operation may be simplified. In addition, both the opening degree of the outlet valve 5v and the opening degree of the turbine bypass valve 7v may be adjusted by the single actuator 14, so that the configuration may be simplified.

Modified Embodiment

Figure 9:
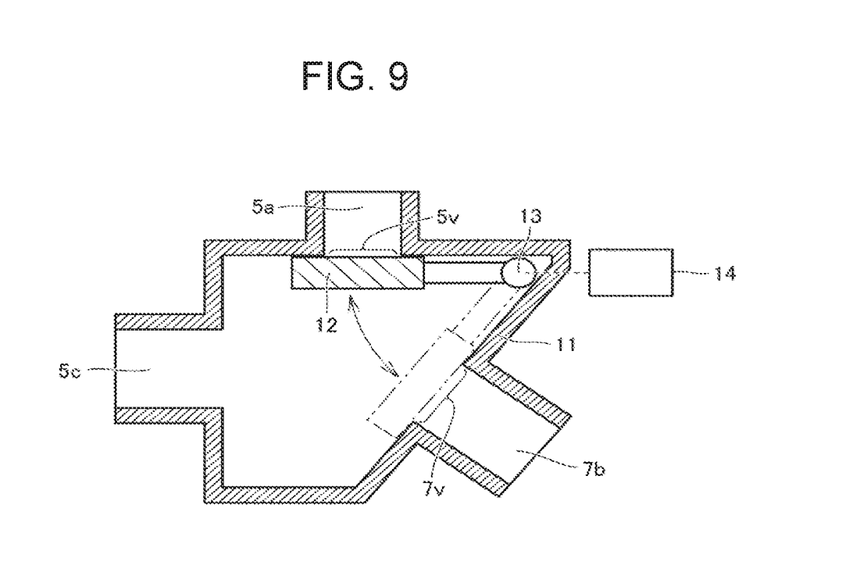
FIG. 9 is a schematic view, showing a modified configuration example of the outlet valve and the turbine bypass valve according to the third embodiment.

The above-described control operation may be achieved with a valve body 12 having a plate shape shown in FIG. 9. In the configuration shown in FIGS. 7 and 8, the opening degree of the turbine bypass valve 7v is adjusted with the outer peripheral surface of the valve body 12 extending in the circumferential direction of the valve body 12. Although the valve body 12 having a plate shape shown in FIG. 9 does not adjust the opening degree of the turbine bypass valve 7v in such way, the function similarly to the above-described function may be achieved by adjusting the distance between the valve body 12 and the pipe on the turbine bypass valve 7v side (the second connecting portion 7b).

Fourth Embodiment

Figure 10:
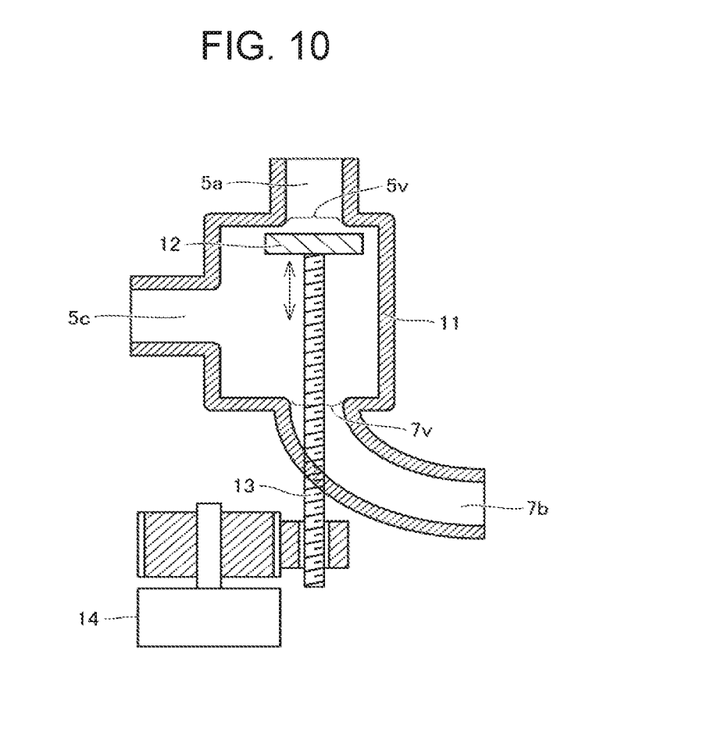
FIG. 10 is a schematic view, showing a configuration example of an outlet valve and a turbine bypass valve according to a fourth embodiment of the present disclosure.

Referring to FIG. 10, a valve body 12 of a linear motion valve configuration may be used for achieving a function similarly to the above-described function. The actuator 14 is connected to the shaft 13 via a plurality of gears to operate the shaft 13 and reciprocally moves the shaft 13 in the axial direction thereof by way of the gears engaged with the shaft 13.

The flow rate of cathode exhaust gas flowing through the valve body 12 and the outlet valve 5v (pipe 5a) may be controlled by adjusting the distance between the valve body 12 and the outlet valve 5v. Additionally, the flow rate of cathode exhaust gas flowing through the valve body 12 and the pipe on the turbine bypass valve 7v side (the second connecting portion 7b) may be controlled by adjusting the distance between the valve body 12 and the turbine bypass valve 7v.

Fifth Embodiment

Figure 11:
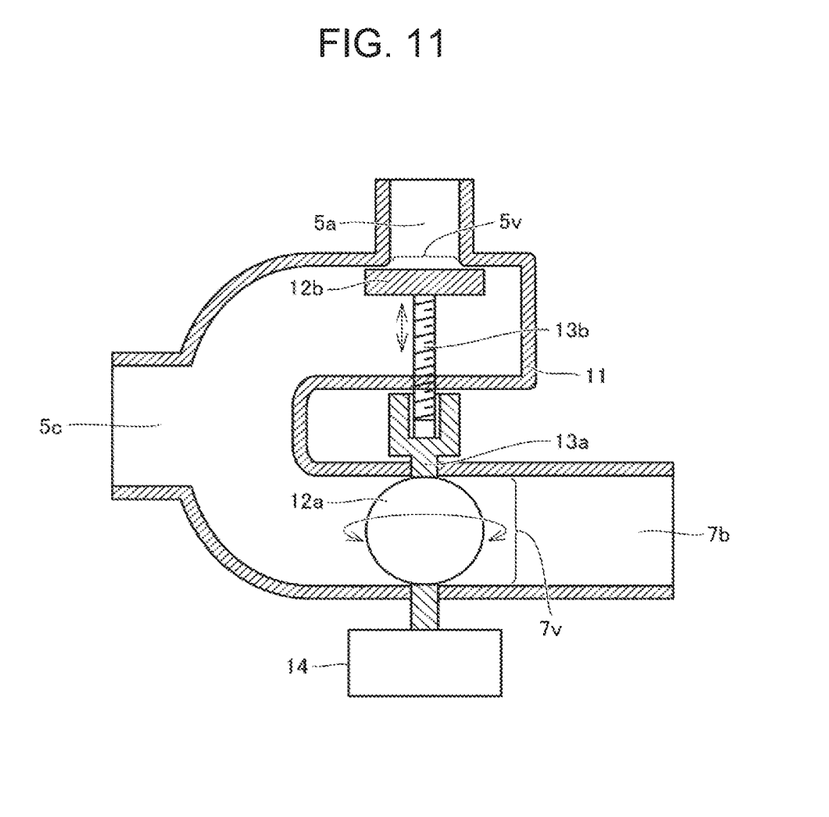
FIG. 11 is schematic view showing, a configuration example of an outlet valve and a turbine bypass valve according to a fifth embodiment of the present disclosure.

Referring to FIG. 11, two valve bodies 12a, 12b may be used for achieving a function similarly to the above-described function. The valve body 12a is of a rotary type butterfly valve, and adjusts the opening degree of the turbine bypass valve 7v. The valve body 12b has a linear motion valve structure and is configured to adjust the opening degree of the outlet valve 5v.

The actuator 14 is connected to the valve body 12a and is connected to the valve body 12b through a shaft 13a having an internally threaded portion and a shaft 13b having an externally threaded portion. Since the shaft 13a and the shaft 13b are screwed with each other, the shaft 13b and the valve body 12b are reciprocally movable in the axial direction with the rotation of the actuator 14.

The flow rate of cathode exhaust gas flowing through the valve body 12b and the outlet valve 5v (pipe 5a) may be controlled by adjusting the distance between the valve body 12b and the outlet valve 5v. Additionally, the flow rate of cathode exhaust gas flowing through the turbine bypass valve 7v may be controlled by adjusting the position of the valve body 12a.

Although the embodiments of the present disclosure have been described as above, the above-described embodiments are examples and are not limited thereto. The technical scope of the present disclosure shall be defined by the claims, and is intended to include embodiments equivalent to the scope of the claims and all modifications within the scope.

What is claimed is:

1. A fuel cell system comprising:
    a fuel cell;
    a supply passage through which a cathode gas is supplied to the fuel cell;
    a discharge passage to which a cathode exhaust gas from the fuel cell is discharged;
    a turbine generating power with the cathode exhaust gas supplied from the discharge passage;
    an outlet valve disposed between the fuel cell and the turbine in the discharge passage and controlling a flow rate of the cathode exhaust gas discharged from the fuel cell to the discharge passage;
    a turbine bypass passage including a first connecting portion connected to the discharge passage at a position between the outlet valve and the turbine and a second connecting portion connected to the discharge passage at a position downstream of the turbine, the first connecting portion and the second connecting portion being communicable with each other;
    a turbine bypass valve disposed between the first connecting portion and the second connecting portion of the turbine bypass passage and controlling a flow rate of the cathode exhaust gas flowing through the turbine bypass passage;
    a pressure sensor detecting a pressure in the fuel cell; and
    a controller controlling an opening degree of the outlet valve and an opening degree of the turbine bypass valve based on data detected by the pressure sensor,
    wherein
    a target pressure value for the pressure in the fuel cell is set depending on a demand output value to the fuel cell,
    the turbine retains a set pressure line representing a relationship between an airflow rate supplied to the turbine and a pressure ratio corresponding to a ratio of a pressure upstream of the turbine to a pressure downstream of the turbine,
    the controller is configured to execute a first control when the target pressure value for the fuel cell is lower than the set pressure line and is configured to execute a second control when the target pressure value for the fuel cell is higher than the set pressure line,
    in executing the second control, the controller controls the outlet valve so as not to be fully opened when the turbine bypass valve is fully closed, and
    when increasing the pressure in the fuel cell to the target pressure value,
        the controller reduces the opening degree of the turbine bypass valve with the outlet valve fully opened, in the first control, and
        the controller reduces the opening degree of the outlet valve with the turbine bypass valve fully closed, in the second control.

2. The fuel cell system according to claim 1, wherein
    the controller reduces at least one of the opening degree of the outlet valve and the opening degree of the turbine bypass valve when increasing the pressure in the fuel cell toward the target pressure value, and
    the controller increases at least one of the opening degree of the outlet valve and the opening degree of the turbine bypass valve when reducing the pressure in the fuel cell toward the target pressure value.

3. The fuel cell system according to claim 1, wherein
    the controller increases the pressure in the fuel cell toward the target pressure value by reducing the opening degree of the outlet valve with the turbine bypass valve fully closed.

4. The fuel cell system according to claim 1, wherein
    the controller reduces the pressure in the fuel cell toward the target pressure value by increasing the opening degree of the turbine bypass valve with the outlet valve fully opened.

5. The fuel cell system according to claim 1, wherein
    the fuel cell system includes a single actuator operated by the controller, and
    the actuator adjusts both the opening degree of the turbine bypass valve and the opening degree of the outlet valve.

6. The fuel cell system according to claim 1, wherein
    the fuel cell system includes a single valve body operated by the controller, and
    the valve body adjusts both the opening degree of the turbine bypass valve and the opening degree of the outlet valve.

* * * * *